United States Patent
Miller

(10) Patent No.: US 7,376,177 B2
(45) Date of Patent: May 20, 2008

(54) CIRCUIT AND METHOD FOR RAKE TRAINING DURING ACQUISITION

(75) Inventor: Timothy R. Miller, Arlington, VA (US)

(73) Assignee: Freescale Semiconductor Inc., Austin, TX (US)

( * ) Notice: Subject to any disclaimer, the term of this patent is extended or adjusted under 35 U.S.C. 154(b) by 518 days.

(21) Appl. No.: 11/045,362

(22) Filed: Jan. 31, 2005

(65) Prior Publication Data

US 2006/0171448 A1    Aug. 3, 2006

(51) Int. Cl.
    *H04B 1/00*    (2006.01)
(52) U.S. Cl. ..................................... 375/148
(58) Field of Classification Search .............. 375/130, 375/136, 140, 141, 145, 147, 148, 149, 152, 375/159, 316, 326, 377; 370/335, 342, 441
    See application file for complete search history.

(56) References Cited

U.S. PATENT DOCUMENTS

| | | | | |
|---|---|---|---|---|
| 6,717,992 | B2 * | 4/2004 | Cowie et al. | 375/316 |
| 6,925,109 | B2 * | 8/2005 | Richards et al. | 375/150 |
| 6,975,665 | B1 * | 12/2005 | McCorkle | 375/130 |
| 7,079,604 | B1 * | 7/2006 | Miller et al. | 375/343 |
| 7,110,473 | B2 * | 9/2006 | Miller et al. | 375/316 |
| 2002/0061081 | A1 | 5/2002 | Richards et al. | |
| 2005/0018750 | A1 * | 1/2005 | Foerster et al. | 375/130 |
| 2005/0089083 | A1 * | 4/2005 | Fisher et al. | 375/130 |

FOREIGN PATENT DOCUMENTS

EP    0643506 A2    3/1995

OTHER PUBLICATIONS

International Search Report and Written Opinion, 2007.
Bottomley, Gregory E. et al., "A Generalized RAKE Receiver for Interference Suppression", *IEEE Journal on Selected Areas in Communications*, vol. 18, No. 8, Aug. 2000, pp. 1536-1545.

* cited by examiner

*Primary Examiner*—Sam K. Ahn

(57) ABSTRACT

A method is provided for training a rake finger (200). In this method the rake finger receives a data signal including a plurality of signal components having a plurality of signal phase values, respectively. (620). The rake finger then sets a current acquisition phase for a locally-generated signal (620) and then calculates a value of an autocorrelation function for the received data signal with the locally-generated signal at the current acquisition phase. (630). The rake finger determines when the autocorrelation function is at a peak value (640), saving the peak value in a storage device (290) when the autocorrelation function is at the peak value (650). The rake finger can then set a finger weight (W) for the rake finger based on the peak value stored in the storage device. This method can be performed at least in part during an acquisition process for the rake finger.

26 Claims, 5 Drawing Sheets

CIRCUIT AND METHOD FOR RAKE TRAINING DURING ACQUISITION

CROSS-REFERENCE TO RELATED PATENT DOCUMENTS

This application is related to U.S. application Ser. No. 10/214,183, filed Oct. 10, 2000, entitled "Mode Controller For Signal Acquisition And Tracking In An Ultra Wideband Communication System," published on Apr. 4, 2003, as U.S. Patent Application Publication No. US 2003-0067963 A1, and issued on Sep. 19, 2006, as U.S. Pat. No. 7,110,473.

FIELD OF THE INVENTION

The present invention relates in general to communication systems, such as ultra wideband (UWB) systems, including wireless mobile transceivers, centralized transceivers, related equipment, and corresponding methods. In particular, the present invention relates to a wireless receiver that uses multiple receiver circuits to perform a raking operation on incoming multipath signal copies to increase the accuracy of signal processing. Another aspect of the present invention relates to a method and circuit by which the weights of individual rake fingers are trained during an acquisition process to reduce or eliminate a training period performed during a data processing period.

BACKGROUND OF THE INVENTION

In receiver architectures in which a transmitted signal can take multiple paths to arrive at the receiver, such as in a wireless environment, a process known as raking can be used to maximize the accuracy of processing of an incoming signal. In a raking process, multiple raking fingers within a single receiver process different incoming multipath signal copies. Each raking finger produces a signal estimate, which is then weighted according to its predicted accuracy. The weighted estimates from each of the raking fingers are then summed to generate a predicted value for the incoming signal.

When performing a raking process, it is necessary to determine the weights that should be used for the various raking fingers. In order to generate weighting values that accurately reflect the predicted accuracy of each raking finger, it is generally necessary to perform a training process during which a known signal pattern is transmitted. During this training process, the accuracy of each raking finger in detecting the known pattern can be evaluated, and so the weights of each finger can be properly assigned.

In one rake training method, each raking finger includes a code processor that provides an estimated value for the multipath signal incoming to that finger. The code processor does this by comparing wavelets in an incoming signal to locally-generated wavelets. However, in order for such a code processor to produce valid signal estimates, it is necessary for a local clock that generates the local wavelets to be properly synchronized in phase with the clock for the incoming multipath signal. As a result, it is necessary to wait until an acquisition process has been completed before rake training can be performed.

Prior to the completion of the acquisition process, the phase of the local clock is not properly matched to the transmitter clock that created the incoming signal, and may even be constantly altered to allow the acquisition process to identify the phase of the transmitter clock.

It would therefore be desirable to allow for a rake training method that could be performed during an acquisition process. In this way, the weights of the raking fingers could be determined during acquisition, a time period where no data processing could be done regardless. Thus, no time after acquisition would be required for rake training, and the entire data receiving process could be performed more quickly.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

Rake Receiver

Figure 1:
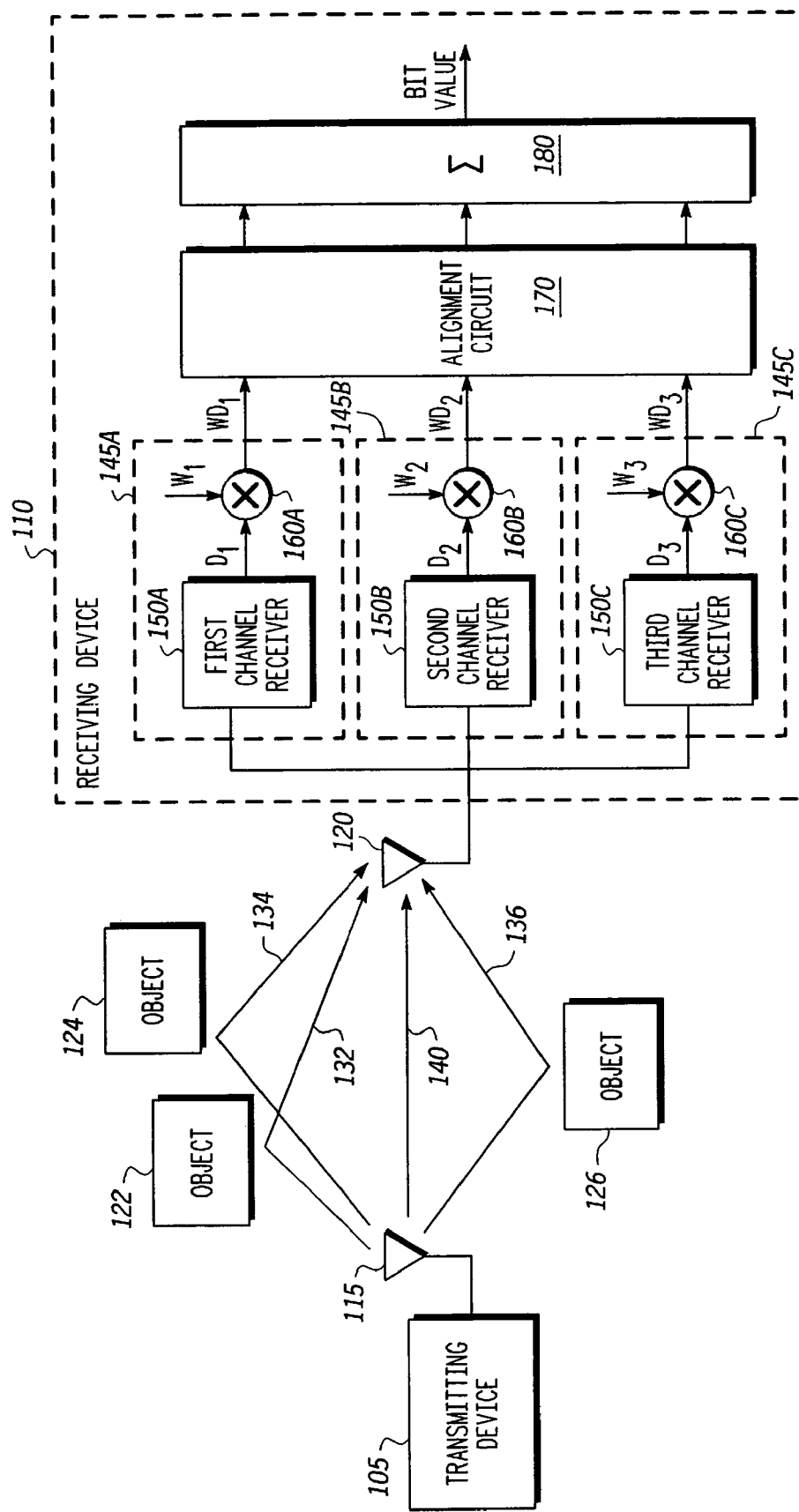
FIG. 1 is a block diagram of a wireless system using a three-channel raking receiver, according to a disclosed embodiment of the present invention.

FIG. 1 is a block diagram of a wireless system using a three-channel raking receiver, according to a disclosed embodiment of the present invention. As shown in FIG. 1, the system 100 includes a transmitting device 105 having a first antenna 115 and a receiving device 110 having a receiving antenna 120. The receiving device 110 includes first, second, and third raking fingers 145A, 145B, and 145C, an alignment circuit 170, and a summer 180. The first, second, and third raking fingers 145A, 145B, and 145C, each respectively include first, second, and third raking receivers 150A, 150B, and 150C, and first, second, and third weighting mixers 160A, 160B, and 160C. Each of the raking fingers 145A-145C can also be referred to as raking channels, raking arms, or any other term used to designate separate rake elements.

The receiving device 105 receives a signal sent from the transmitting device 110 along multiple signal paths 132, 134, 136, 140, and uses a three channel rake process for processing the signal transmitted from the transmitting device 105. As shown in FIG. 1, the signal paths can be a direct path 140 or reflected paths 132, 134, 136 that bounce off of one or more nearby objects 122, 124, 126. Although only three reflected signal paths 132, 134, and 136 are shown, many more paths will generally exist. Only three reflected signal paths 132, 134, and 136 are shown for simplicity of disclosure.

The first through third channel receivers 150A-150C in the first through third raking fingers 145A-145C, each receive respective signals from the receiving antennae 120, but process the received signals differently.

In the embodiment disclosed in FIG. 1, the receiving antennae 120 is attached to the first, second, and third channel receivers 150A-150C in the receiving device 110, each of which channel receiver 150A-150C tunes into a particular multipath signal.

The first, second and third channel receivers 150A-150C respectively output first, second, and third data signals $D_1$, $D_2$, and $D_3$, which are then respectively weighted by first, second, and third weight values $W_1$, $W_2$, and $W_3$ to form first, second, and third weighted data signals $WD_1$, $WD_2$, and $WD_3$, through the first through third weighting mixers 160A-160C.

The first through third weighted data signals $WD_1$-$WD_3$ are then aligned in phase using an alignment circuit 170. This alignment is necessary to make certain that the multipath signals being processed by each finger 150A-150C are aligned to the same position within the data stream with respect to each other. Because the various possible signal paths 132, 134, 136, 140 may have different lengths, multipath signals may arrive at the receiving antenna 120 at different phases with respect to each other. The alignment circuit delays the signals to match the slowest multipath component so that they are all processed at the same phase.

Although disclosed in FIG. 1 as being after the first through third weighting mixers 160A-160C, in alternate embodiments the alignment circuit 170 could be formed prior to the first through third weighting mixers 160A-160C.

The aligned and weighted multipath components are then added together in a summer 180, which outputs a final estimate for the data values from the incoming signal.

The first through third weights $W_1$-$W_3$ used in the receiving device 110 of FIG. 1 are used to account for the variance of the received wavelets. If a large wavelet is correlated at one raking finger, that large signal will receive a greater weight than a smaller wavelet received at another raking finger. This higher weight indicates that the signal received at that particular finger is more likely to be the correct signal.

The raking finger with the highest weight will be identified as having a received wavelet that produces a bit estimate with a low probability of error. The other raking fingers are identified as receiving wavelets that provide bit values with correspondingly greater errors, and so they have smaller weights. However, if the raking fingers have been trained properly, when the system combines the three weighted signals the combined result will have a lower probability of error than the output of any one of the raking fingers by itself (even the raking finger with the lowest error).

Because the summer 180 adds values output from the first through third weighting mixers 160A-160C, the final result has information from all three raking channels. And because each of the first through third data signals $D_1$-$D_3$ are weighted by the first through third weighting signals $W_1$-$W_3$, respectively, the more accurate arms contribute more to the resulting bit value output from the summer 180. In the case where all thee signal paths have equal weights, the RAKE can provide $10*\log_{10}(3)$ dB gain, which is significant.

In some embodiments the first through third weighting signals $W_1$-$W_3$ will be normalized to some value, e.g., such that they sum to one. However, what is of primary importance is the ratio between the first through third weighting signals $W_1$-$W_3$, which indicates their relative weights with respect to each other.

Consider the following example in which the receiving device 110 of FIG. 1 receives delayed wavelets traveling along signal paths 132, 134, 136, and 140. In this example, the first channel receiver 150A locks onto the second strongest wavelet, the second channel receiver 150B locks onto the strongest wavelet, and the third channel receiver 150C locks onto the third strongest wavelet. The fourth strongest wavelet is not locked onto because it is the smallest of all four of the multipath wavelets, and the receiving device 110 only has three raking channels.

The first channel receiver 150A produces a first data value $D_1$, the second channel receiver 150B produces a second data value $D_2$, and the third channel receiver 150C produces a third data value $D_3$.

Because the second channel receiver 150B processes the strongest wavelet, the second data value $D_2$ will be weighted the highest. Similarly, because the first channel receiver 150A processes the second strongest wavelet, the first data value $D_1$ will be weighted the second highest. Finally, because the third channel receiver 150C processes the third strongest of the processed wavelets, the third data value $D_3$ will be weighted the lowest. Thus, $W_2 > W_1 > W_3$.

Alternate embodiments could vary which receiver 150A-150C receives the strongest, second strongest, and third strongest multipath wavelets. And in some cases multipath wavelets could be coincident with each other, reducing the number of available multipath wavelets.

Although the preferred embodiment of FIG. 1 discloses three raking receivers 150A-150C, alternate embodiments could expand this to N raking receivers, where N is an integer greater than one. In this case each of the N receiver outputs will be weighted by a respective first through $N^{th}$ weight value $W_1$-$W_N$.

In addition, although FIG. 1 discloses a transmitting device 110 and a receiving device 120, either or both of these devices can be transceivers.

Raking Finger

Figure 2:
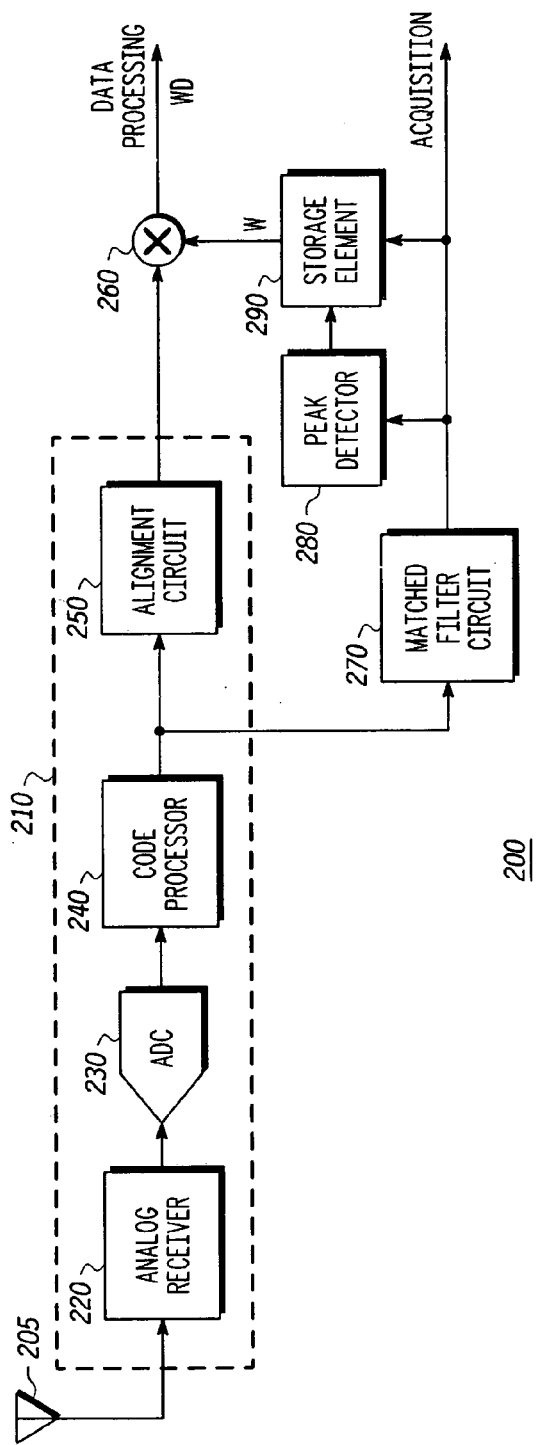
FIG. 2 is a block diagram of a raking finger according to one disclosed embodiment of the present invention.

FIG. 2 is a block diagram of a raking finger according to one disclosed embodiment of the present invention. As shown in FIG. 2, the raking finger 200 includes a channel receiver 210, a mixer 260, a matched filter circuit 270, a peak detector 280, and a storage element 290. The channel receiver 210 further includes an analog receiver 220, an analog-to-digital converter 230, a code processor 240, and an alignment circuit 250.

The analog receiver 220 receives an incoming multipath signal from an antenna and performs all necessary analog processing. This can include filtering, gain control, and other front end processing.

Figure 3:
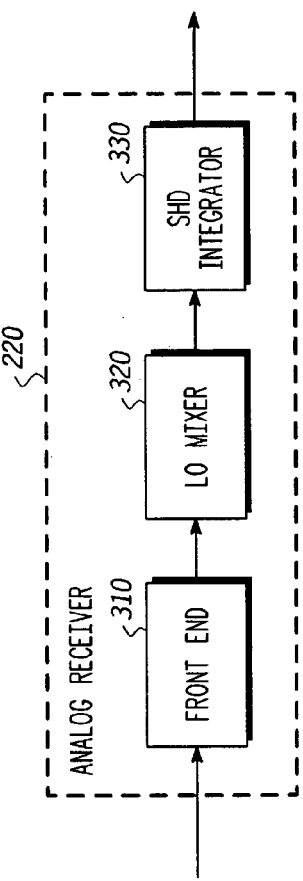
FIG. 3 is a block diagram of an exemplary analog receiver according to a disclosed embodiment.

FIG. 3 is a block diagram of an exemplary analog receiver 220 according to a disclosed embodiment. As shown in FIG. 3, the analog receiver 220 includes front end circuitry 310, a local oscillator (LO) mixer 320, and a sample-hold-dump (SHD) integrator 330. Alternate embodiments can include a filter after the SHD integrator 330.

The front end circuitry 310 performs all necessary front end processing on the incoming multipath signal. This can include filtering, gain control, and the like.

The LO mixer 320 mixes the incoming signal with a locally generated signal. During an alignment process the locally-generated signal is aligned in phase and frequency with the incoming signal. Once properly aligned, the output of the LO mixer 320 can be used by the code processor 240 to create a maximum correlation value between the incoming signal and the locally-generated signal.

The SHD integrator 330 integrates the mixed signal output from the LO mixer 320 to provide integrated signal values at a set sample rate. These integrated signal values result in solid digital values in later processing. In some embodiments, the sample rate for the LO mixer 320 will be set at the wavelet duration for the incoming multipath signal. In this way, once properly aligned, each value output from the SHD integrator 330 will correspond to one wavelet.

The analog signal output from the analog receiver is converted to a digital signal by the analog-to-digital converter (ADC) 230 for further processing. The digital output from the ADC 230 includes signal components and a noise component.

The code processor 240 in the raking finger 200 receives the digital signal output from the ADC 230 (which corresponds to an integrated and digitized version of the output of the LO mixer 320) and uses this signal to generate an estimated data signal D once an acquisition process is completed. In operation, the code processor 240 multiplies the digital signal output from the ADC 230 with a known chip sequence that corresponds to one data bit and sums the result over one bit period. Each sample output by the code processor is also made up of a signal portion and a noise portion.

The alignment circuit 250 works in conjunction with alignment circuits in other raking fingers to align the estimate of the multipath signal being processed by the current raking finger 200 with multipath signals being processed by the other raking fingers, to create an aligned data estimate D.

Although the alignment circuit 250 in this embodiment is disclosed as being within the channel receiver 210, in alternate embodiments it could be provided outside of the channel receiver 210, either before or after the mixer 260.

The mixer 260 receives the aligned data estimate D and mixes it with the weight W associated with the current raking finger 200 to produce a weighted data estimate WD. This weighted data estimate WD is then provided to a rake processor for summing with other weighted data estimates from other raking fingers.

The matched filter circuit 270 is designed to have an impulse response that fully matches or closely matches the autocorrelation function of an incoming wavelet or code word and a locally-generated wavelet or code word. This autocorrelation function has a maximum value when the incoming signal and the locally-generated signal are matched in phase with each other (i.e., when the phase offset between them is zero).

Thus, the matched filter circuit 270 convolves the output of the code processor 240 with the known autocorrelation function (or an approximation of the autocorrelation function) to produce a detection value that is used for acquisition.

The output of the matched filter 270 is monitored to determine the location of the peaks in the filtered autocorrelation value. The maximum of the peaks is compared to a threshold value to determine whether an adequate signal is present for reception. This threshold value may be a fixed value or a variable threshold that adapts to background noise.

In one embodiment the matched filter 270 is an infinite impulse response (IIR) filter, though in alternate embodiments other sorts of filters can be used (e.g., a finite impulse response (FIR) filter).

Because the matched filter 270 is matched to the autocorrelation function, its output provides a good estimate of the amplitude of the incoming signal when its output is at a peak. And since the relative strength (i.e., amplitude) of the incoming multipath signal compared to other incoming multipath signals is what determines the weighting value W, the peak output of the matched filter 270 can be used to set the weighting value W.

The peak detector 280 operates to detect local peaks in the output of the matched filter 270. And when it finds a peak, the peak detector 280 instructs the storage element 290 to store both the peak value and the current phase of the peak. One way to accomplish this is by having the peak detector 280 detect when the slope of the output of the matched filter 270 changes sign. Another way is to divide the output of the matched filter into sectors and find the maximum values in each sector. Other ways of peak detection (sometimes called "bump hunting") would be known to one skilled in the art, and may be used to implement the peak detector 280.

The storage element 290 stores one or more peak value and phase location pairs corresponding to peak values output from the matched filter, as instructed by the peak detector 280. When the raking finger 210 determines what multipath signal it will process, that multipath signal will have an associated phase. In order to determine the weighting value W that should be used with the selected multipath signal, the raking finger 210 need only look in the storage element 290 to see what matched filter peak value is associated with the phase value corresponding to the selected multipath signal and use that peak value as the weighting value W.

Acquisition Process

As noted above, during an acquisition process an incoming signal is mixed with a locally-generated signal (which is a copy of the incoming signal) as the locally-generated signal is shifted in phase throughout a set phase range (e.g., $2\pi$ radians of phase). The resulting autocorrelation signal is monitored to determine where a maximum point of the autocorrelation signal appears. The phase at which this maximum point occurs in the autocorrelation signal corresponds to a desired acquisition phase.

One advantageous way to detect peaks in the autocorrelation signal is to pass the autocorrelation signal through a matched filter that is matched to the shape of the autocorrelation function. As noted with respect to the description of the matched filter circuit 270, this matched filter can be an FIR filter or an IIR filter. An FIR filter can be set to exactly match the autocorrelation function, but will generally be more complicated than an IIR filter. In contrast, an IIR filter will be less complex than an FIR filter, but will only provide an approximation of the autocorrelation function. In practice, either implementation can work, depending upon system requirements. The filter has the effect of reducing the noise, allowing the true maximum to be found and also a better estimate of the maximum value.

Since the output of the matched filter 270 has reduced noise and provides a better estimate of the peak input value, the output of the matched filter 270 can be used for rake training during the acquisition process. There is no need to wait until acquisition is completed before rake training can begin. As a result, rake training can be started, and may even be completed during the acquisition process.

Scaling of Weighting Values

Figure 4:
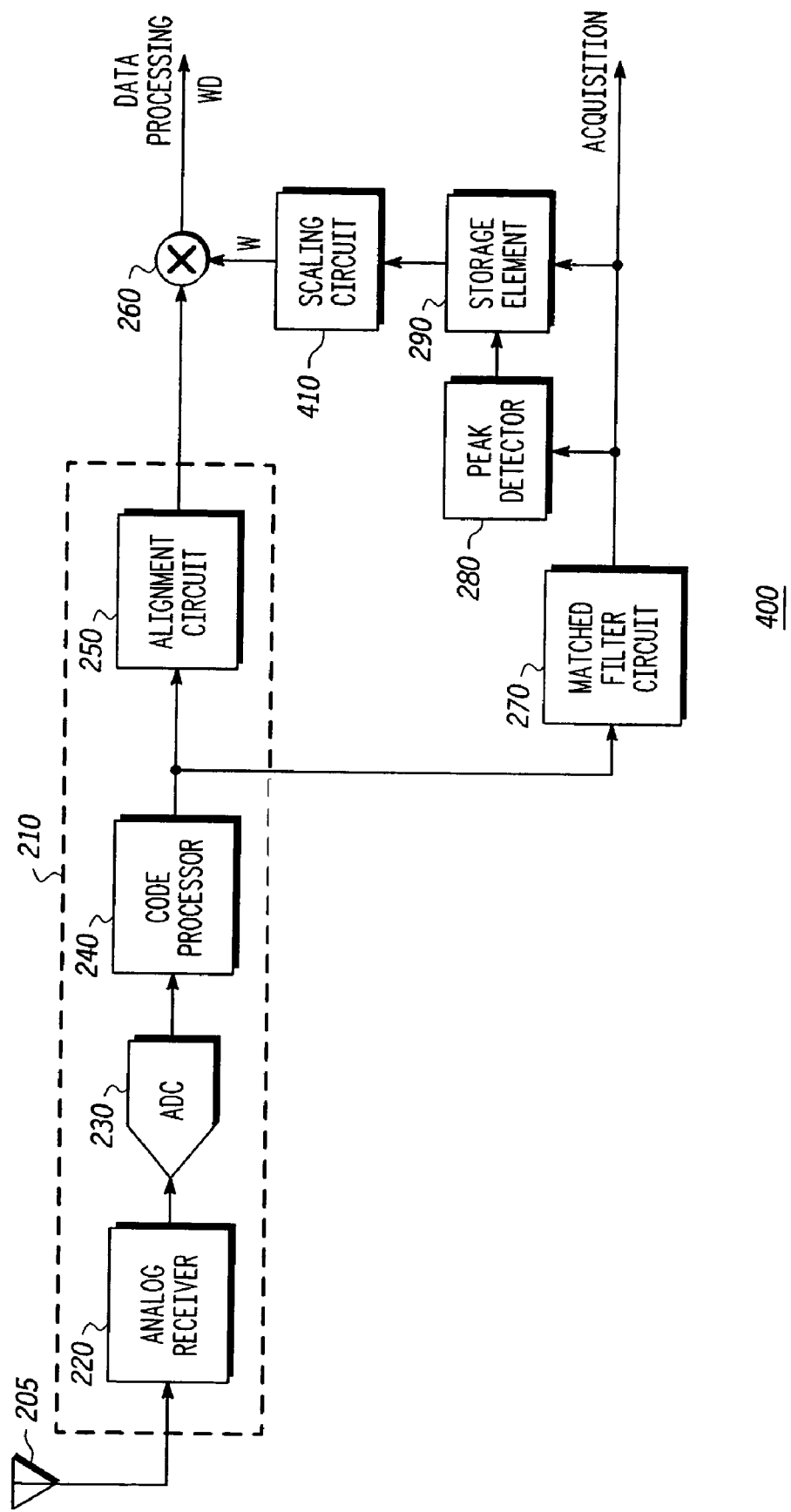
FIG. 4 is a block diagram of an exemplary analog receiver according to a disclosed embodiment.

As noted above, the weighting values provided to the mixer 260 in FIG. 2 can be scaled. FIG. 4 is a block diagram of a raking finger using a scaled weighting value according to one disclosed embodiment of the present invention. As shown in FIG. 4, the raking finger 400 includes a channel receiver 210, a mixer 260, a matched filter circuit 270, a peak detector 280, and a storage element 290, and a scaling circuit 410. The channel receiver further includes an analog receiver 220, an analog-to-digital converter 230, a code processor 240, and an alignment circuit 250.

The elements in FIG. 4 that are common to FIG. 2 operate as described above with respect to FIG. 2. In addition, the scaling circuit 410 is provided between the storage element 290 and the mixer 260.

The scaling circuit 410 multiplies the output of the storage element 290 by a scaling factor N, to provide a scaled weighting factor W. The scaling factor can be any value desired. In one embodiment the scaling factor is one divided by the sum of all of the unscaled weighting factors. In this way the weights are scaled such that they sum to one. In other embodiments the scaling factor can be any number, including fractions.

Receiver Circuit

Figure 5:
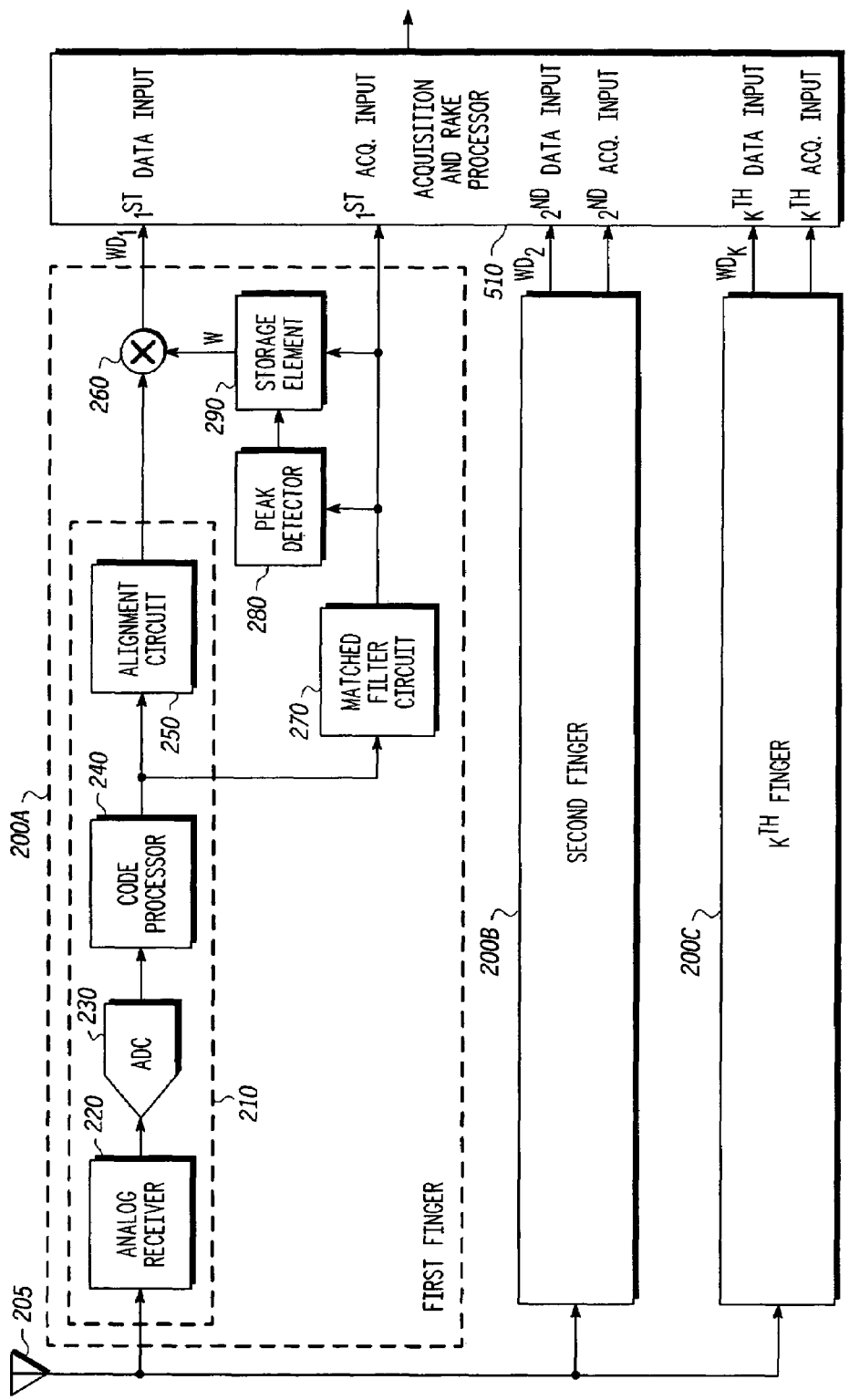
FIG. 5 is a block diagram of a receiver including N raking fingers according to a disclosed embodiment of the present invention.

FIG. 5 is a block diagram of a receiver including K raking fingers according to a disclosed embodiment of the present invention. As shown in FIG. 5, the receiver 500 includes an antenna 205, first through $K^{th}$ raking fingers 200A-200C, and an acquisition and rake processor 510.

The antenna receives a plurality of multipath signals and provides them to each of the first through $K^{th}$ raking fingers 200A-200C.

The first through $K^{th}$ raking fingers 200A-200C each operate as described above with respect to FIG. 2. Each receives the plurality of multipath signals and provides a weighted data value $WD_1$-$WD_K$, and a matched filter output $C_1(n)$-$C_K(n)$ to the acquisition and rake processor 510.

During an acquisition mode, the rake processor 510 monitors the first through $K^{th}$ matched filter outputs to determine the phases associated with the K largest incoming multipath signals. The acquisition and rake processor 510 can then use this information to instruct the first through $K^{th}$ raking fingers 200A-200C which multipath signals they should process.

During a data processing mode, the acquisition and rake processor 510 sums the first through $K^{th}$ weighted data estimates to provide a final data estimate.

Raking Process

Figure 6:
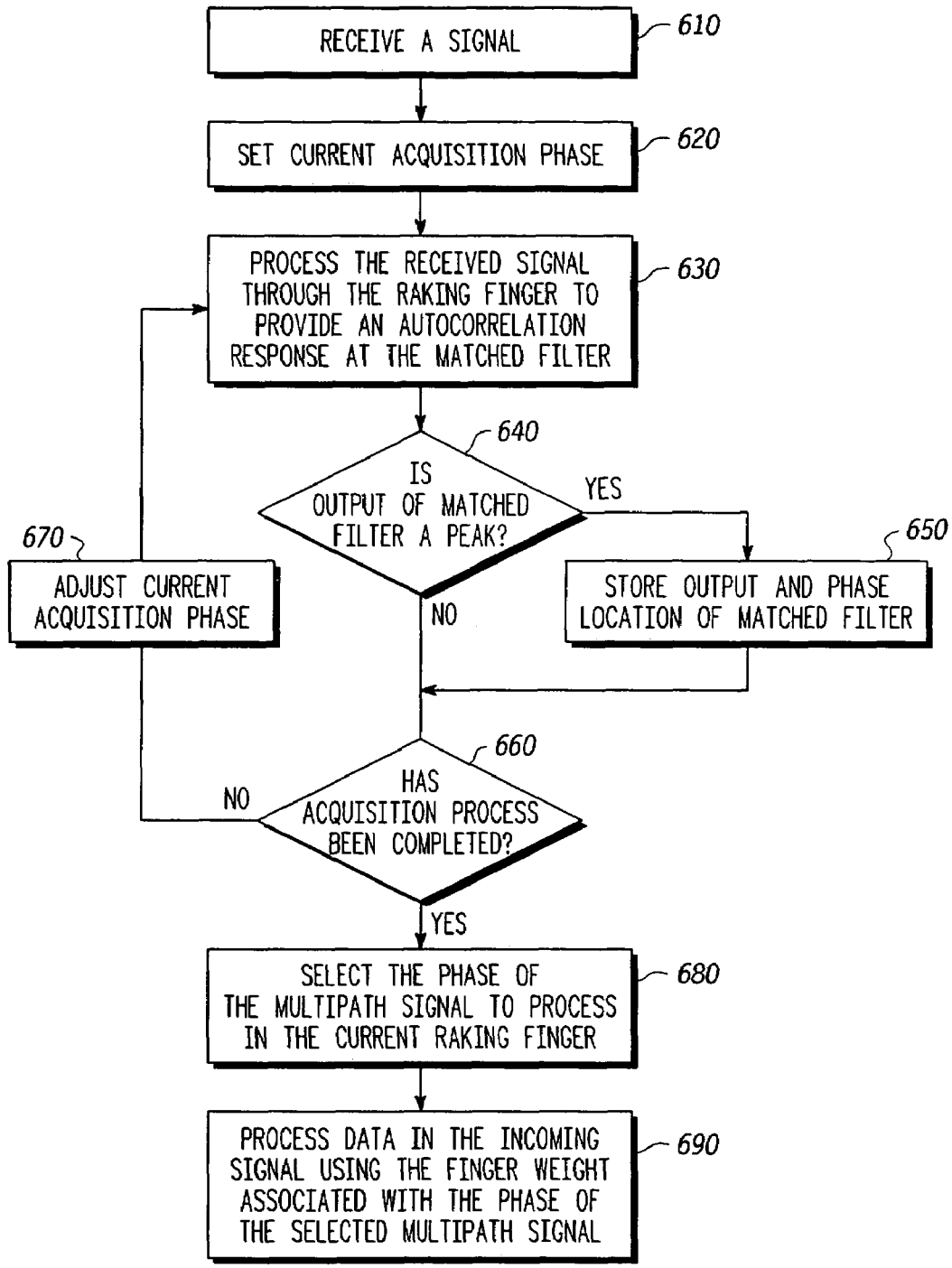
FIG. 6 is a flow chart of a rake training process for one raking finger according to a disclosed embodiment of the present invention.

FIG. 6 is a flow chart of a rake training process for one raking finger according to a disclosed embodiment of the present invention. As shown in FIG. 6, the rake training process is performed during an acquisition process, which eliminates the need to lose time after acquisition for rake training.

The rake training process begins when the raking finger receives an incoming signal. (610) This signal will contain a plurality of multipath components.

The raking finger then sets the current acquisition phase (620) and processes the received signal through the circuitry in the raking finger (e.g., as shown above in FIG. 2), to ultimately provide an autocorrelation response at the matched filter. (630)

The raking finger will then determine whether the autocorrelation response output from the matched filter is a peak value. (640) As disclosed above, this can be performed by recording the maximum output value over each section of the set of possible code phases, or by detecting when the phase of the derivative of the matched filter changes from positive to negative.

If the output of the matched filter is a peak value, the raking finger will store the peak output value and the current phase location of the matched filter (650) and then proceed to determine whether the signal has been acquired (660) (i.e., whether the acquisition process is completed).

If the output of the matched filter is not a peak value, the raking finger will simply determine whether the acquisition process has been completed (660).

If the acquisition process has not been completed, the raking finger will adjust the current acquisition phase to a new acquisition phase (670) and process the received signal at the new acquisition phase (630).

If, however, the signal has been acquired (i.e., the acquisition process is completed), the raking finger will select the phase of the multipath signal it should process (680) (i.e., the phase of the matched filter peak associated with that multipath signal). The raking finger will then proceed to process the incoming signal using the stored finger weight associated with the phase of the selected multipath signal. (690)

Each of the raking fingers can simultaneously perform the same process over non-overlapping code phases. Thus, the entire codewheel is rapidly spanned, acquisition is performed, and all rake fingers are trained at the same time.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of training a rake finger, at least in part during an acquisition process for the rake finger, comprising:
    receiving a data signal including a plurality of signal components having a plurality of signal phase values, respectively;
    setting a current acquisition phase for a locally-generated signal;
    calculating a value of an autocorrelation function for the received data signal with the locally-generated signal at the current acquisition phase;
    determining when the autocorrelation function is at a peak value;
    saving the peak value in a storage device when the autocorrelation function is at the peak value; and
    setting a finger weight for the rake finger based on the peak value stored in the storage device.

2. A method of training a rake finger, as recited in claim 1, further comprising saving the current acquisition phase in the storage device when the autocorrelation function is at the peak value.

3. A method of training a rake finger, as recited in claim 1, wherein the autocorrelation function is computed by varying the current acquisition phase of the locally-generated signal against the data signal, and passing the autocorrelation function through a filter to obtain an estimate of finger weight.

4. A method of training a rake finger, as recited in claim 3, wherein the filter is one of: matched to the autocorrelation function, and approximately matched to the autocorrelation function.

5. A method of training a rake finger, as recited in claim 3, wherein the filter is one of: an infinite impulse response filter, and a finite response filter.

6. A method of training a take finger, as recited in claim 3, wherein the peak value is determined by finding a maximum output of the filter over an interval of phase offsets.

7. A method of training a rake finger, as recited in claim 1, wherein the peak value is determined by finding phase locations at which a derivative of a filter output changes sign from positive to negative.

8. A method of training a rake finger, as recited in claim 1, wherein the finger weight is determined by one of: using the stored peak value directly as the finger weight, and multiplying the stored peak value by a scaling factor to generate the finger weight.

9. A method of training a rake finger, as recited in claim 1, wherein the method is implemented in an integrated circuit.

10. A method of training a rake finger, as recited in claim 1, wherein the method is implemented in an ultra wideband device.

11. A method of training a rake finger, as recited in claim 1, further comprising:
saving the current acquisition phase in the storage device when the autocorrelation function is at the peak value;
setting the current acquisition phase to a new acquisition phase;
repeating the calculating of the autocorrelation function, the determining when the autocorrelation value is at a peak value, the saving of the peak value, and the saving of the current acquisition phase one or more times,
wherein a plurality of pairs of peak value and acquisition phase are stored in the storage device, each acquisition phase corresponding to one of the plurality of signal components,
wherein the finger weight for the rake finger is set based on one of the peak values stored in the storage device.

12. A raking finger, comprising:
an analog receiver circuit for receiving a data signal including a plurality of signal components having a plurality of signal phase values, respectively, and performing analog signal processing operations on the data signal to produce a processed analog signal;
an analog-to-digital converter for converting the processed analog signal to a digital signal;
a code processor for correlating a codeword against on the digital signal to produce a processed digital signal;
a matched filter for processing an autocorrelation waveform in the processed digital signal to produce a filtered autocorrelation value;
a peak detector for determining when the filtered autocorrelation value has a peak value;
a storage element for storing one or more peak values; and
a mixer for mixing the processed digital signal with a finger weight value derived from the one or more peak values.

13. A raking finger, as recited in claim 12, wherein the finger weight value is equal to one of the one or more peak values stored in the storage element.

14. A raking finger, as recited in claim 12, wherein the storage element also stores one or more phase values associated with the one or more peak values, respectively.

15. A raking finger, as recited in claim 12, further comprising an alignment circuit for aligning symbols of the processed digital signal with corresponding symbols in other processed digital signals in other raking fingers.

16. A raking finger, as recited in claim 12, further comprising a scaling circuit for multiplying one of the peak values stored in the storage element by a scaling value to generate the finger weight value.

17. A raking finger, as recited in claim 12, wherein the analog receiver further comprises a local oscillator mixer for mixing the data signal with a locally-generated signal.

18. A raking finger, as recited in claim 12, wherein the matched filter is one of: an infinite impulse response filter, and a finite response filter.

19. A raking finger, as recited in claim 12, further comprising an antenna for receiving a wireless signal and providing the wireless signal to the analog receiver circuit as the data signal.

20. A raking finger, as recited in claim 12, wherein the rake receiver is implemented in an ultra wideband device.

21. A raking finger, as recited in claim 12, wherein the rake receiver is implemented in an integrated circuit.

22. A raking receiver, comprising:
first through $K^{th}$ raking fingers, each receiving a data signal including a plurality of signal components having a plurality of signal phase values, respectively, and providing first through $K^{th}$ weighted data signals, respectively; and
a rake processor for receiving the first through $K^{th}$ weighted data signals and processing them to generate a signal estimate,
wherein each of the first through Kraking fingers further comprises:
an analog receiver circuit for receiving the data signal and performing analog signal processing operations on the data signal to produce a processed analog signal;
an analog-to-digital converter for converting the processed analog signal to a digital signal;
a code processor for correlating a digital codeword against the digital signal to produce a processed signal;
a matched filter for processing an autocorrelation waveform in the processed signal to produce a filtered autocorrelation value;
a peak detector for determining when the filtered autocorrelation value has a peak value;
a storage element for storing one or more peak values; and
a mixer for mixing the processed digital signal with a finger weight value, and
wherein K is an integer.

23. A raking receiver, as recited in claim 22, wherein the storage element also stores one or more phase values associated with the one or more peak values, respectively.

24. A rake receiver, as recited in claim 22, further comprising an antenna for receiving a wireless signal and providing the wireless signal to the first through $K^{th}$ raking fingers as the data signal.

25. A raking finger, as recited in claim 22, wherein the rake receiver is implemented in an ultra wideband device.

26. A raking finger, as recited in claim 22, wherein the rake receiver is implemented in an integrated circuit.

* * * * *

UNITED STATES PATENT AND TRADEMARK OFFICE
CERTIFICATE OF CORRECTION

PATENT NO.       : 7,376,177 B2
APPLICATION NO.  : 11/045362
DATED            : May 20, 2008
INVENTOR(S)      : Timothy R. Miller It is certified that error appears in the above-identified patent and that said Letters Patent is hereby corrected as shown below:

In Column 10, Line 33, Claim 22;

Change "wherein each of the first through Kraking fingers further" to

--wherein each of the first through $K^{th}$ raking fingers further--

Signed and Sealed this

Sixteenth Day of September, 2008

JON W. DUDAS
*Director of the United States Patent and Trademark Office*